United States Patent
Stein (10) Patent No.: US 11,824,572 B2
(45) Date of Patent: Nov. 21, 2023

(54) DIGITAL FILTER CIRCUIT, MEASUREMENT INSTRUMENT, AND SIGNAL PROCESSING METHOD

(71) Applicant: Rohde & Schwarz GmbH & Co. KG, Munich (DE)

(72) Inventor: Manuel Stein, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 11 days.

(21) Appl. No.: 17/671,827

(22) Filed: Feb. 15, 2022

(65) Prior Publication Data

US 2023/0009129 A1    Jan. 12, 2023

Related U.S. Application Data (63) Continuation-in-part of application No. 17/370,346, filed on Jul. 8, 2021.

(51) Int. Cl.
    *H04B 1/12*    (2006.01)
(52) U.S. Cl.
    CPC .................................. *H04B 1/123* (2013.01)
(58) Field of Classification Search
    CPC ..................................................... H04B 1/123
    See application file for complete search history.

(56) References Cited

U.S. PATENT DOCUMENTS

| | | | |
|---|---|---|---|
| 8,644,427 B2 * | 2/2014 | Porret | H04B 1/006 |
| | | | 455/142 |
| 9,985,608 B2 * | 5/2018 | Onkar | H03H 17/04 |

(Continued)

OTHER PUBLICATIONS

Balla, P. et al., "Higher radix aperiodic-convolution algorithms," in IEEE Transactions on Acoustics, Speech, and Signal Processing, vol. 34, No. 1, pp. 60-68, Feb. 1986.

(Continued)

*Primary Examiner* — Dac V Ha
(74) *Attorney, Agent, or Firm* — CHRISTENSEN O'CONNOR JOHNSON KINDNESS PLLC (57) ABSTRACT

A digital filter circuit for processing at least one signal is described. The digital filter circuit includes an input circuit, a first filter sub-circuit, and a second filter sub-circuit. The input circuit is configured to receive at least two real-valued input signals and/or at least one complex-valued input signal. The digital filter circuit has a first configuration that is associated with complex-valued input signals, wherein in the first configuration the first filter sub-circuit is configured to filter a real part of the at least one complex-valued input signal and the second filter sub-circuit is configured to filter an imaginary part of the at least one complex-valued input signal. The digital filter circuit has a second configuration that is associated with real-valued input signals, wherein in the second configuration the first filter sub-circuit and the second filter sub-circuit are configured to filter the at least two real-valued input signals in parallel and/or wherein the first filter sub-circuit and the second filter sub-circuit are configured to jointly filter at least one of the at least two real-valued input signals with increased parallelism. Further, a measurement instrument and a signal processing method are described.

19 Claims, 2 Drawing Sheets

(56) References Cited

U.S. PATENT DOCUMENTS

| | | | |
|---|---|---|---|
| 2011/0105068 A1* | 5/2011 | Reddy | H04B 1/0014 |
| | | | 455/207 |
| 2012/0036947 A1* | 2/2012 | Dobyns | G01R 23/163 |
| | | | 73/866.3 |
| 2012/0288034 A1* | 11/2012 | Fireaizen | G01R 29/0273 |
| | | | 375/340 |
| 2019/0348970 A1* | 11/2019 | Skinner | H03H 17/0202 |
| 2020/0355729 A1 | 11/2020 | Antonin et al. | |
| 2022/0209805 A1* | 6/2022 | Yu | H04B 1/0007 |

OTHER PUBLICATIONS

Mou, Z. and P. Duhamel, "Short-length FIR filters and their use in fast nonrecursive filtering," in IEEE Transactions on Signal Processing, vol. 39, No. 6, pp. 1322-1332, Jun. 1991.

* cited by examiner

Fig. 3

DIGITAL FILTER CIRCUIT, MEASUREMENT INSTRUMENT, AND SIGNAL PROCESSING METHOD

CROSS-REFERENCE TO RELATED APPLICATION

This application is a continuation-in-part of U.S. patent application Ser. No. 17/370,346, filed on Jul. 8, 2021, the disclosure of which is incorporated herein in its entirety.

FIELD OF THE DISCLOSURE

Embodiments of the present disclosure generally relate to a digital filter circuit for processing at least one signal. Embodiments of the present disclosure further relate to a measurement instrument and to a signal processing method.

BACKGROUND

Different data formats are employed for different types of measurements in measurement systems.

For example, if measurements with respect to amplitudes and phases of a signal are conducted, the corresponding measurement data processed by a measurement instrument may be complex-valued, as the real part and the imaginary part capture both the amplitude and the phase of the signal. On the other hand, if measurements of the power of a signal are conducted, the corresponding measurement data processed by the measurement instrument may be real-valued.

In order to provide a large versatility, measurement instruments should be able to process both real-valued and complex-valued measurement data.

The measurement instrument may comprise a digital filter circuit with two sub-circuits, wherein the different sub-circuits process the real part and the imaginary part of the measurement data, respectively, if the measurement data is complex-valued.

If the measurement data is real-valued, one of the filter sub-circuits is deactivated, and the measurement data is processed by the other filter sub-circuit. Accordingly, available processing resources remain idle if real-valued measurement data is processed.

Thus, there is a need for a digital filter circuit and a measurement instrument that use available processing resources more efficiently.

SUMMARY

Embodiments of the present disclosure provide a digital filter circuit for processing at least one signal. In an embodiment, the digital filter circuit comprises an input circuit, a first filter sub-circuit, and a second filter sub-circuit. The input circuit is configured to receive at least two real-valued input signals and/or at least one complex-valued input signal. The digital filter circuit has a first configuration that is associated with processing complex-valued input signals, wherein in the first configuration the first filter sub-circuit is configured to filter a real part of the at least one complex-valued input signal and the second filter sub-circuit is configured to filter an imaginary part of the at least one complex-valued input signal. The digital filter circuit has a second configuration that is associated with processing real-valued input signals, wherein in the second configuration the first filter sub-circuit and the second filter sub-circuit are configured to filter the at least two real-valued input signals in parallel and/or wherein the first filter sub-circuit and the second filter sub-circuit are configured to jointly filter at least one of the at least two real-valued input signals with increased parallelism.

In the digital filter circuit according to embodiments of the present disclosure, all available processing resources, namely the first filter sub-circuit and the second filter sub-circuit, can be used irrespective of whether the input signal is real-valued or complex-valued.

If the input signal is complex-valued, i.e. in the first configuration of the digital filter circuit, the first filter sub-circuit and the second filter sub-circuit process the real part and the imaginary part of the input signal, respectively.

If a single real-valued input signal is received by the digital filter circuit, i.e. in the second configuration of the digital filter circuit, the first filter sub-circuit and the second filter sub-circuit jointly process the input signal. This way, the real-valued input signal can be processed with an increased parallelism, which corresponds to an increased obtainable bandwidth compared to the state of the art.

If at least two real-valued input signals are received in the second configuration of the digital filter circuit, the at least two real-valued input signals are processed by the first filter sub-circuit and by the second filter sub-circuit in parallel. In other words, the first filter sub-circuit and the second filter sub-circuit together correspond to a parallelized filter circuit that is configured to process the at least two real-valued input signals in parallel.

Thus, compared to the state of the art, the maximum number of channels for processing real-valued input signals is increased.

Hence, the input circuit is generally capable of receiving two or even more real-valued input signals. However, the input circuit may also only receive a single real-valued input signal. In any case, the filter sub-circuits are located downstream of the input circuit such that the input circuit passes the respective signal(s) to the subsequent filter sub-circuits.

For instance, the single real-valued input signal is forwarded to the filter sub-circuits for further processing, namely jointly filtering the single real-valued input signal with increased parallelism by the first filter sub-circuit and the second filter sub-circuit.

However, the input circuit may also receive two real-valued input signals, wherein only one of them is forwarded to the first filter sub-circuit and the second filter sub-circuit. The other one of the two real-valued input signals may be either disregarded or processed by a different filter sub-circuit, for instance a third filter sub-circuit of the digital filter circuit.

Accordingly, the digital filter circuit according to embodiments of the present disclosure allows for an increased bandwidth and/or for an increased number of channels if real-valued input signals are processed.

Of course, the digital filter circuit may comprise more than two filter sub-circuits, such that more than one complex-valued input signal and/or more than two real-valued input signals can be processed simultaneously and/or with increased parallelism.

Embodiments of the digital filter circuit may be switchable between the different configurations. In other words, the digital filter circuit may be switchable between different operational modes, wherein the different operational modes correspond to the first configuration and to the second configuration, for example the three different functionalities mentioned above, namely processing a complex complex-valued input signal, processing at least two real-valued input signals in parallel, and processing one real-valued input signal with increased parallelism.

It is noted that the digital filter circuit may further comprise a third configuration, in which both at least one complex-valued input signal and at least one real-valued input signal are received and processed. In some embodiments, two filter sub-circuits may be provided for each complex-valued input signal, and one filter sub-circuit may be provided for each real-valued input signal.

According to an aspect of the present disclosure, the digital filter circuit is, for example, established as a down-converter, as a low-pass filter, as a high-pass filter, as an interpolator, and/or as a decimator. Thus, the digital filter circuit according to embodiments of the present disclosure is usable for a large variety of different applications.

According to another aspect of the present disclosure, the digital filter circuit is, for example, switchable between the first configuration and the second configuration. The digital filter circuit may be configured to automatically switch to the appropriate configuration based on whether the received input signal(s) is (are) real-valued or complex-valued.

Alternatively or additionally, the configuration may be set by a user, e.g. via a suitable user interface.

Alternatively or additionally, the digital filter circuit may be controlled by an external control circuit to switch to the appropriate configuration, e.g. by a control circuit of a measurement instrument.

Of course, the digital filter circuit may also be switchable between the first configuration, the second configuration, and the third configuration.

A further aspect of the present disclosure provides that in the second configuration the first filter sub-circuit and the second filter sub-circuit are, for example, configured to filter the at least two real-valued input signals independent of each other. Thus, at least two different real-valued input signals can be processed independent of each other by the digital filter circuit according to the present disclosure.

In some embodiments, the first filter sub-circuit and the second filter sub-circuit may filter the different real-valued input signals with different filter lengths and/or with a different parallelism. This is particularly advantageous if the at least two real-valued input signals have different data rates and/or different parallelism.

Accordingly, the first filter sub-circuit and/or the second filter sub-circuit may have different operational modes, wherein the different operational modes have a different number of filter taps and/or a different parallelism. This is described in detail in the U.S. patent application Ser. No. 17/370,346, the content of which is incorporated herein in its entirety by reference.

In an embodiment of the present disclosure, the input circuit comprises $2^M$ input channels, such that the input circuit is configured to receive up to $2^M$ real-valued input signals or up to $2^{M-1}$ complex-valued input signals, wherein M is an integer equal to or greater than 0. Accordingly, the digital filter circuit may comprise $2^M$ filter sub-circuits, such that all of the $2^M$ real-valued input signals or all of the $2^{M-1}$ complex-valued input signals can be processed simultaneously by the digital filter circuit.

In some embodiments, M is equal to 1, 2, 3, 4, 5, or 6. Thus, the digital filter circuit may comprise up to 64 input channels, such that up to 64 real-valued signals or up to 32 complex-valued input signals can be received and processed. However, it is to be understood that M may also be greater than 6.

In a further embodiment of the present disclosure, the digital filter circuit is configured to process $2^P$ digital symbols simultaneously, wherein P is an integer equal to or greater than 0. P may also be called "parallelism" of the digital filter circuit, "data parallelism" of the digital filter circuit, or "parallelization" of the digital filter circuit.

For example, P may be equal to or greater than 0, and equal to or smaller than 8. However, it is to be understood that P may also be greater than 8.

Thus, in general terms, the digital filter circuit is configured to process a m×p real-valued input signal, wherein $m=2^M$ is the number of channels, and wherein $p=2^P$ is a data parallelism of the input signal. Thus, m denotes the number of active channels, i.e. the number of signals that are processed in parallel by an electronic component upstream of the digital filter circuit. Further, p denotes the number of data points or rather samples per time interval, for example the number of data points or rather samples per clock cycle. Accordingly, p denotes the number of samples of the respective signal that are processed in parallel (in each channel) by an electronic component upstream of the digital filter circuit.

Likewise, the digital filter circuit is configured to process a n×p complex-valued input signal, wherein $n=m/2=2^{M-1}$ is the number of complex-valued channels, and wherein $p=2^P$ is the data parallelism.

For example, the digital filter circuit may have a signal rate per channel that is between 1 GS/s and 50 GS/s.

According to an aspect of the present disclosure, the input circuit comprises, for example, $2^M$ input channels, such that the input circuit is configured to receive up to $2^M$ real-valued input signals or up to $2^{M-1}$ complex-valued input signals, wherein M is an integer equal to or greater than 0, and wherein the M and P are adjustable under a constraint that the sum of M and P is constant.

In other words, M and P may be subject to the constraint M+P=C, with C being an integer and being constant. Hence, M and P can be selected with the constraint that their sum is always the same, e.g. the constant value C.

In other words, the number of channels may be reduced in exchange for an increased parallelism. Likewise, the number of channels may be increased in exchange for a reduced parallelism.

A further aspect of the present disclosure provides that the digital filter is established as, for example, a finite impulse response (FIR) filter. Accordingly, the first filter sub-circuit and the second filter sub-circuit are established as FIR filters, respectively. FIR filters have the advantage that the phases of the signals by the FIR filters are not distorted. Thus, the digital filter circuit according to the present disclosure preserves phase relations between the different real-valued input signals and/or the different complex-valued input signals.

In a further embodiment of the present disclosure, the digital filter is established as a short-length finite impulse response (SFIR) filter. SFIR filters are a particularly resource efficient filter type for processing signals having a high data rate and/or a high parallelism. Thus, a particularly resource-efficient digital filter circuit is provided.

Generally, a short-length FIR filter is a well-known type of FIR filter. Short-length FIR filters are based on short length FIR filtering algorithms that have a reduced complexity, thereby enabling a small delay processing, for example independent on the FIR filter length. In other words, short-length FIR filters have a reduced arithmetic complexity where all multiplications are replaced by decimated sub-filters. Typically, a short-length FIR filter has a filter length that is lower than several hundred. Concerning short-length FIR filters, reference is also made to Zhi-Jian Mou and Pierre Duhamel, "Short-Length FIR Filters and Their Use in Fast Nonrecursive Filtering" in IEEE TRANSACTIONS ON SIGNAL PROCESSING, VOL. 39, NO. 6, June 1991 or rather Prabhakara C. Balla, Andreas Antoniou and Salvatore D. Morgera, "Higher Radix Aperiodic-Convolution Algorithms" in IEEE TRANSACTIONS ON ACOUSTICS, SPEECH, AND SIGNAL PROCESSING, VOL. ASSP-34, NO. 1, February 1986.

The digital filter circuit may comprise a local oscillator circuit, wherein the local oscillator circuit is configured to generate a local oscillator signal.

For example, the local oscillator signal may be used for down-converting the input signal(s) by mixing the input signal(s) with the local oscillator signal and appropriately filtering the mixed signal(s).

Alternatively or additionally, the local oscillator signal may serve as a reference clock for processing the input signal(s).

Alternatively or additionally, the input signals may be synchronized based on the local oscillator signal. For example, time delays between the input signals may be compensated based on the local oscillator signal.

In some embodiments, the local oscillator circuit is established as a numerically controlled oscillator. Accordingly, the local oscillator circuit may be tunable to generate a local oscillator signal with appropriate frequency for the input signals to be processed.

According to an aspect of the present disclosure, the digital filter comprises, for example, at least one of an ASIC or an FPGA. Thus, the digital filter circuit is implemented in hardware at least partially, for example completely. For example, the filter sub-circuits and/or the input circuit may comprise one or several ASICs and/or FPGAs that are configured to perform the functionality described in the present disclosure. Accordingly, the digital filter circuit can process the input signal(s) at a particularly high data rate due to the implementation of the digital filter circuit in hardware.

In an embodiment of the present disclosure, at least one of the input circuit, the first filter sub-circuit, or the second filter sub-circuit is configured to compensate time delays between the at least two real-valued input signals or between the real and imaginary parts of the at least one complex-valued input signal. In general, relative time delays between the input signals, between filtered input signals, or between different portions of the same (filtered) input signal may be caused by the processing of the input signals by means of different filter sub-circuits of the digital filter circuit. The input circuit, the first filter sub-circuit, and the second filter sub-circuit may be configured to compensate these time delays such that the original phase-relation between the input signals is restored in output signals of the digital filter circuit.

According to another aspect of the present disclosure, the digital filter circuit comprises, for example, an output circuit, wherein the output circuit is configured to output signals filtered by the first filter sub-circuit and by the second filter sub-circuit. Thus, the output circuit is configured to output at least two real-valued output signals and/or at least one complex-valued output signal.

For example, the output signals may correspond to down-converted input signals, low-pass filtered input signals, high-pass filtered input signals, interpolated input signals and/or decimated input signals.

In a further embodiment of the present disclosure, the output circuit is configured to compensate time delays between the at least two real-valued input signals or between the real and imaginary parts of the at least one complex-valued input signal. Accordingly, original phase relations between the at least two real-valued input signals are restored or rather preserved by the digital filter circuit.

Alternatively or additionally, the output circuit may be configured to compensate time delays between the at least two real-valued output signals or between the real and imaginary parts of the at least one complex-valued output signal. Accordingly, original phase relations between the real and imaginary parts are restored or rather preserved by the digital filter circuit.

Embodiments of the present disclosure further provide a measurement instrument. In an embodiment, the measurement instrument comprises a digital filter circuit described above.

Regarding the advantages and further properties of the measurement instrument, reference is made to the explanations given above with respect to the digital filter circuit, which also hold for measurement instrument and vice versa.

According to an aspect of the present disclosure, the measurement instrument is established as, for example, an oscilloscope, as a digital oscilloscope, as a spectrum analyzer, as a signal analyzer, or as a vector network analyzer. However, it is to be understood that the measurement instrument may be established as any other type of measurement device that is configured to process both real-valued measurement data and complex-valued measurement data.

Embodiments of the present disclosure further provide a signal processing method of processing digital signals by a digital filter circuit. The digital filter circuit may comprise a first filter sub-circuit, and a second filter sub-circuit. The digital filter circuit has a first configuration that is associated with processing complex-valued input signals. The digital filter circuit has a second configuration that is associated with processing real-valued input signals. In the first configuration at least one complex-valued input signal is received, wherein a real part of the at least one complex-valued input signal is filtered by the first filter sub-circuit, and an imaginary part of the at least one complex-valued input signal is filtered by the second filter sub-circuit. In the second configuration at least two real-valued input signals are received, wherein the at least two real-valued input signals are filtered in parallel by the first filter sub-circuit and the second filter sub-circuit. Alternatively or additionally, in the second configuration at least one real-valued input signal is received, wherein the at least one real-valued input signal is filtered jointly by the first filter sub-circuit and the second filter sub-circuit with increased parallelism.

In some embodiments, the digital filter circuit described above and the measurement instrument described above are configured to perform the signal processing method.

Regarding the advantages and further properties of the signal processing method, reference is made to the explanations given above with respect to the digital filter circuit and to the measurement instrument, which also hold for the signal processing method and vice versa.

In an embodiment of the present disclosure, the digital filter circuit is switchable between the first configuration and the second configuration. The digital filter circuit may automatically switch to the appropriate configuration based on whether the received input signal(s) is (are) real-valued or complex-valued.

Alternatively or additionally, the configuration may be set by a user, e.g. via a suitable user interface, for example via a suitable user interface of the measurement instrument.

Alternatively or additionally, the digital filter circuit may be controlled by an external control circuit to switch to the appropriate configuration, e.g. by a control circuit of a measurement instrument.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
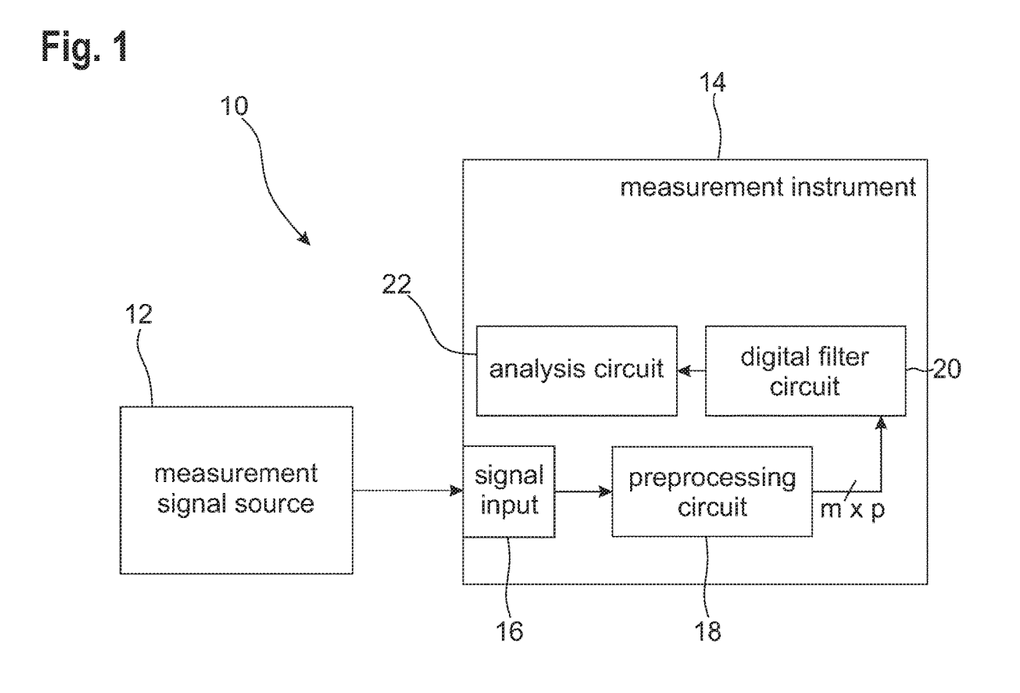
FIG. 1 schematically shows a measurement system with a measurement instrument according to an embodiment of the present disclosure.

FIG. 1 schematically shows a measurement system 10 comprising a measurement signal source 12 and a measurement instrument 14. In general, the measurement signal source 12 may be any electronic device, a plurality of electronic devices, or any type of electronic circuitry that generates an analog or digital signal that can be analyzed by the measurement instrument 14. For example, the measurement signal source 12 is a device under test. The device under test may be any electronic device or any electronic circuit.

The measurement signal source 12 is connected to the measurement instrument 14 in a signal-transmitting manner, such that a measurement signal or a plurality of measurement signals is transmitted from the measurement signal source 12 to a signal input 16 of the measurement instrument 14. Therein and in the following, the term "connected in a signal-transmitting manner" is understood to denote a cable-based or wireless connection that is configured to transmit signals between the respective devices or components. For example, the measurement signal may be picked up by a measurement probe contacting certain contact points of the measurement signal source 12.

Alternatively or additionally, an output of the measurement signal source 12 may be connected to the signal input 16 of the measurement instrument 14 by means of cables or other suitable electric circuitry. Alternatively or additionally, the measurement signal source 2 may generate a wireless signal that is received by means of one or several antennas that are connected to or integrated into the signal input 16 of the measurement instrument 14.

In general, the measurement instrument 14 is configured to receive, process and analyze the measurement signal received from the measurement signal source 12. The measurement signal received by the signal input 16 is forwarded to a preprocessing circuit 18 of the measurement instrument 14.

In some embodiments, the term "circuit" refers to or includes, inter alia, a combination of hardware (e.g. a processor such as an integrated circuit, digital circuits or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

The preprocessing circuit 18 preprocesses the measurement signal in any way that is suitable for the particular measurement signal(s) at hand. In some embodiments, the preprocessing circuit 18 may comprise one or several analog-to-digital converters. If the measurement signal is an analog input signal, the preprocessing circuit 18 digitizes the measurement signal, thereby generating a digital measurement signal.

In general, the output signal of the preprocessing circuit 18 is a m×p digital signal, wherein, $m=2^M$ is the number of channels, and $p=2^P$ is a data parallelism of the input signal. Therein, M and P are integers that are each greater than or equal to 0. Thus, m denotes the number of active channels, i.e. the number of signals that are processed in parallel by the preprocessing circuit 18. Further, p denotes the number of data points or rather samples per time interval, particularly the number of data points or rather samples per clock cycle. Accordingly, p denotes the number of samples that are processed in parallel (in each channel) by the preprocessing circuit 18.

Therein, m may be equal to the number of input channels of the measurement instrument 14. However, m may also be different from the number of input channels of the measurement instrument 14.

The m×p digital signal is forwarded to a digital filter circuit 20 of the measurement instrument 14. The digital filter circuit 20 processes the m×p digital signal, thereby generating a digital output signal. The functionality of the digital filter circuit 20 will be described in more detail below.

The output signal of the digital filter circuit 20 is forwarded to an analysis circuit 22 of the measurement instrument 14. The analysis circuit 22 may analyze the digital output signal of the digital filter circuit 20 as is appropriate for the particular measurement at hand.

Figure 2:
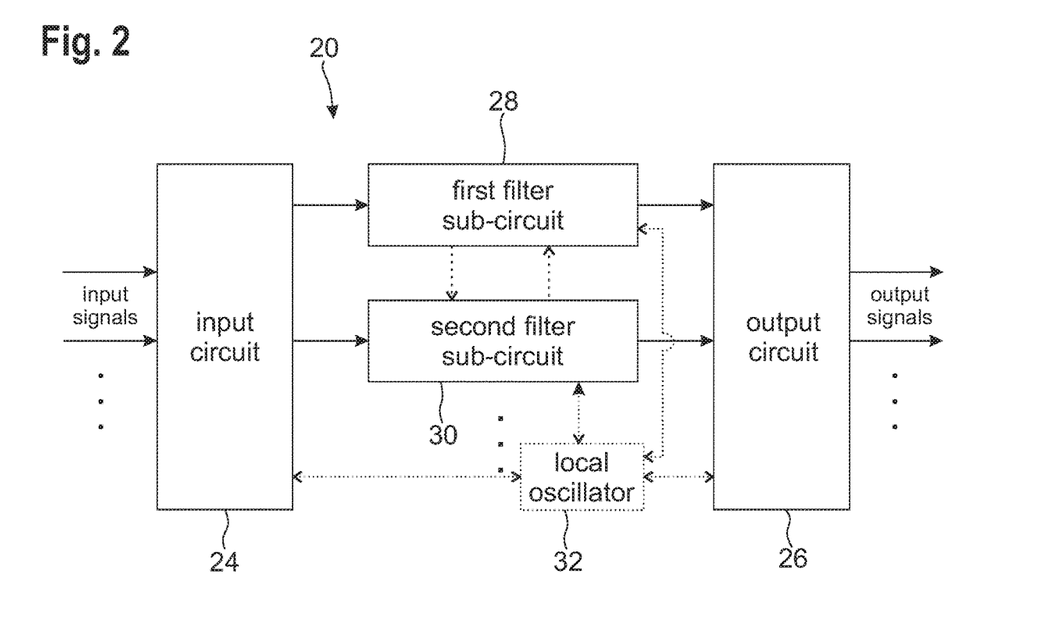
FIG. 2 schematically shows a digital filter circuit according to an embodiment of the present disclosure.

FIG. 2 schematically shows the digital filter circuit 20 in more detail. The digital filter circuit 20 comprises an input circuit 24, an output circuit 26, a first filter sub-circuit 28, and a second filter sub-circuit 30. It is noted that the digital filter circuit 20 may comprise more than two sub-filter circuits, e.g. 4, 8, 16, or even more sub-filter circuits. The digital filter circuit 20 is implemented in hardware at least partially, for example completely. More precisely, the filter sub-circuits 28, 30, the input circuit 24, and/or the output circuit 26 may comprise one or several ASICs and/or FPGAs that are configured to perform the functionality described in the present disclosure. Further, the filter sub-circuits 28, 30 may be established as finite impulse response (FIR) filters or as short-length finite impulse response (SFIR) filters.

In general, the digital filter circuit 28 may be established as a downconverter, as a low-pass filter, as a high-pass filter, as an interpolator, and/or as a decimator, as is appropriate for the particular measurement to be performed. If the digital filter circuit 28 is established as a downconverter, the digital filter circuit 28 may comprise a local oscillator circuit 32 that is configured to generate a local oscillator signal.

The local oscillator signal is used by the filter sub-circuits 28, 30 in order to down-convert received signals by mixing them with the local oscillator signal and by appropriately filtering the mixed signals. In some embodiments, the local oscillator circuit 32 is configured as a numerically controlled oscillator.

Figure 3:
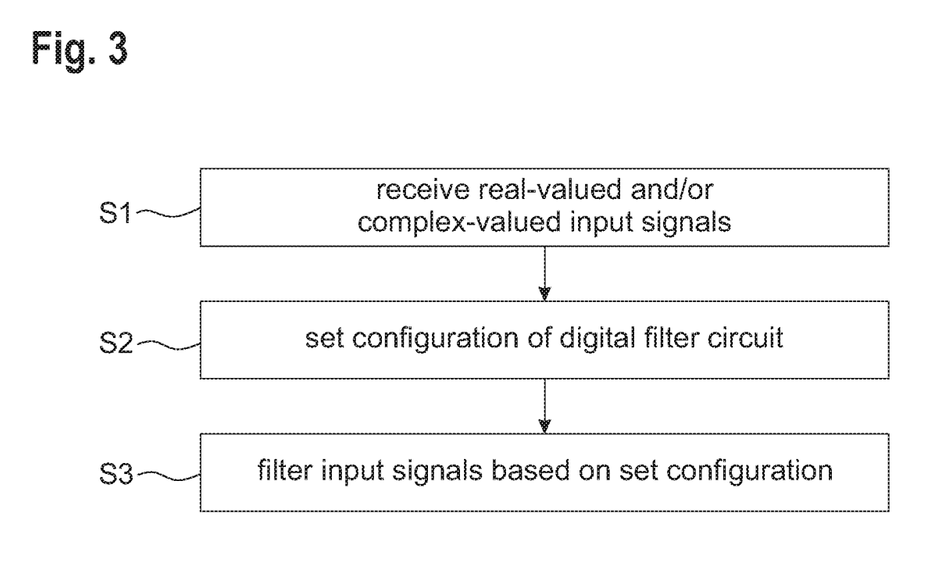
FIG. 3 shows a flow chart of a signal processing method according to an embodiment of the present disclosure.

The measurement instrument 12, for example the digital filter circuit 20, is configured to perform a signal processing method that is described in the following with reference to the embodiment of FIG. 3.

The m×p digital signal, which is also referred to as "input signals" in the following, is received by the input circuit 24 (step S1). The m×p digital signal may be real-valued and/or complex-valued. More precisely, the m×p digital signal may comprise up to m real-valued signals or up to n=m/2 complex-valued signals.

In some embodiments, the input circuit 24 receives up to $2^M$ real-valued input signals and/or up to $2^{M-1}$ complex-valued input signals, wherein M is an inter equal to or greater than 1.

Depending on whether the input signals are real-valued or complex-valued, the digital filter circuit 20 is switched into one of at least two different configurations, at least if the digital filter circuit is not already in the appropriate configuration (step S2).

A first configuration of the digital filter circuit 20 is associated with processing complex-valued input signals, i.e. at least one complex-valued input signal is received by the digital filter circuit 20. A second configuration of the digital filter circuit 20 is associated with processing real-valued input signals, i.e. at least one real-valued input signal is received by the digital filter circuit 20.

The digital filter circuit 20 may be configured to automatically switch to, i.e. set the appropriate configuration based on whether the received input signal(s) is (are) real-valued or complex-valued.

Alternatively or additionally, the configuration may be set by a user, e.g. via a suitable user interface of the measurement instrument 14. Alternatively or additionally, the digital filter circuit 20 may be controlled by an external control circuit to switch to the appropriate configuration, e.g. by a control circuit of the measurement instrument 14. In other words, the external control circuit may set the configuration of the digital filter circuit 20.

It is noted that the digital filter circuit 20 may further comprise a third configuration, in which both at least one complex-valued input signal and at least one real-valued input signal are received and processed, which corresponds to a combination of the first configuration and of the second configuration.

The input signal(s) is (are) processed by the digital filter circuit based on the configuration of the digital filter circuit 20, thereby generating one or several output signals (step S3).

In general, the output signals may correspond to down-converted input signals, low-pass filtered input signals, high-pass filtered input signals, interpolated input signals and/or decimated input signals.

Alternatively or additionally, the first filter sub-circuit 28, the second filter sub-circuit 30, the input circuit 24, and/or the output circuit 26 compensates time delays between the at least two real-valued input signals or between the real and imaginary parts of the at least one complex-valued input signal. This is described in detail in the U.S. patent application Ser. No. 17/370,346, which is incorporated herein in its entirety by reference.

In the first configuration, the first filter sub-circuit 28 filters a real part of the at least one complex-valued input signal, while the second filter sub-circuit 30 filters an imaginary part of the at least one complex-valued input signal. In other words, the real part and the imaginary part of the at least one complex-valued input signal are filtered in parallel by the first filter sub-circuit 28 and the second filter sub-circuit 30, respectively.

If more than one complex-valued input signal is to be processed, e.g. up to n=m/2 complex-valued input signals, the digital filter circuit 20 may comprise further pairs of filter sub-circuits, namely a total of n pairs of filter sub-circuits.

Thus, each complex-valued input signal is processed by a pair of filter sub-circuits, respectively, analogously to the processing of the at least one complex-valued input signal by the first filter sub-circuit 28 and the second filter sub-circuit 30.

In the second configuration, if at least two real-valued input signals are received, the at least two real-valued input signals are processed by the first filter sub-circuit 28 and by the second filter sub-circuit 30 in parallel. In other words, the first filter sub-circuit 28 and the second filter sub-circuit 30 together correspond to a parallelized filter circuit that is configured to process the at least two real-valued input signals in parallel.

In the second configuration, if only a single real-valued input signal is received, the first filter sub-circuit 28 and the second filter sub-circuit 30 may jointly process the input signal with increased parallelism, i.e. with increased bandwidth, as is indicated in FIG. 2 by the dashed arrows connecting the first filter sub-circuit 28 and the second filter sub-circuit 30. In other words, the digital filter circuit 20 described above is configured to process a varying number of input signals with varying parallelism, i.e. with varying bandwidth. This is possible due to the following configuration of the individual components of the digital filter circuit:

The input circuit 24 is configured to receive and selectively forward an $m_{in} \times p_{in}$ signal to the filter sub-circuits 28, 30, wherein $m_{in}=2^{M_{in}}$ is the number of channels and wherein $p_{in}=2^{P_{in}}$ is the parallelism of the input circuit 24. The parameters $m_{in}$ and $p_{in}$ can be freely adapted, except for the constraint $M_{in}+P_{in}=C_{in}$, wherein $C_{in}$ is a constant integer greater than 0.

The output circuit 26 is configured to output a $m_{out} \times p_{out}$ signal, wherein $m_{out}=2^{M_{out}}$ is the number of channels and wherein $p_{out}=2^{P_{out}}$ is the parallelism of the output circuit 26. The parameters $m_{out}$ and $p_{out}$ can be freely adapted, except for the constraint $M_{out}+P_{out}=C_{out}$, wherein $C_{out}$ is a constant integer greater than 0.

The input circuit 24 and the output circuit 26 can be operated in different configurations, i.e. $M_{in}$ may be different from $M_{out}$, and $P_{in}$ may be different from $P_{out}$.

The first filter sub-circuit 28 and the second filter sub-circuit 30 (and as the case may be further filter sub-circuits) are configured to filter a $m_{calc} \times p_{calc}$ signal wherein $m_{calc}=2^{M_{calc}}$ is the (combined) number of channels and wherein $p_{calc}=2^{P_{calc}}$ is the (combined) parallelism of the filter sub-circuits 28, 30. The parameters $m_{calc}$ and $p_{calc}$ can be freely adapted, except for the constraint $M_{calc}+P_{calc}=C_{calc}$, wherein $C_{calc}$ is a constant integer greater than 0.

This means that the filter sub-circuits 28, 30 can process up to $m_{calc}/2$ complex-valued signals or up to $m_{calc}$ real-valued input signals simultaneously. However, the number of channels can be reduced in exchange for an increased parallelism.

In some embodiments, if complex-valued input signal are filtered, the parallelism can be increased up to $p_{calc,max}=2^{C_{calc}-min\ (M_{calc}-1)}$, wherein $min(M_{calc})$ corresponds to the minimum number of channels for processing complex-valued input signals.

If real-valued input signals are filtered, the parallelism can be increased up to $P_{calc,max}=2^{C_{calc}-min\ (M_{calc})}$, wherein min($M_{calc}$) corresponds to the minimum number of channels for processing real-valued input signals.

The first configuration and the second configuration of the digital filter circuit 20 described above are obtained by appropriately setting the parameters m and p for the input circuit 24, the output circuit 26, and the filter sub-circuits 28, 30.

Thus, the all available processing resources of the digital filter circuit 20 can be used regardless of whether the input signal is complex-valued or real-valued. More precisely, free processing resources can be used to increase the number of channels and/or the parallelism of the digital filter circuit 20.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

Throughout this specification, terms of art may be used. These terms are to take on their ordinary meaning in the art from which they come, unless specifically defined herein or the context of their use would clearly suggest otherwise.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A digital filter circuit for processing at least one signal, comprising
an input circuit configured to receive at least two real-valued input signals and/or at least one complex-valued input signal, wherein the input circuit comprises $2^M$ input channels, such that the input circuit is configured to receive up to $2^M$ real-valued input signals or up to $2^{M-1}$ complex-valued input signals, wherein M is an integer equal to or greater than 0;
a first filter sub-circuit; and a second filter sub-circuit, wherein the digital filter circuit has a first configuration that is associated with processing complex-valued input signals, wherein in the first configuration the first filter sub-circuit is configured to filter a real part of the at least one complex-valued input signal and the second filter sub-circuit is configured to filter an imaginary part of the at least one complex-valued input signal, and
wherein the digital filter circuit has a second configuration that is associated with processing real-valued input signals, wherein in the second configuration the first filter sub-circuit and the second filter sub-circuit are configured to filter the at least two real-valued input signals in parallel and/or wherein the first filter sub-circuit and the second filter sub-circuit are configured to jointly filter at least one of the at least two real-valued input signals with increased parallelism.

2. The digital filter circuit of claim 1, wherein the digital filter circuit is established as a downconverter, as a low-pass filter, as a high-pass filter, as an interpolator, and/or as a decimator.

3. The digital filter circuit of claim 1, wherein the digital filter circuit is switchable between the first configuration and the second configuration.

4. The digital filter circuit of claim 1, wherein in the second configuration the first filter sub-circuit and the second filter sub-circuit are configured to filter the at least two real-valued input signals independent of each other.

5. The digital filter circuit of claim 1, wherein M is equal to 1, 2, 3, 4, 5, or 6.

6. The digital filter circuit of claim 1, wherein the digital filter circuit is configured to process $2^P$ digital symbols simultaneously, wherein P is an integer equal to or greater than 0.

7. The digital filter circuit of claim 6, wherein the M and P are adjustable under a constraint that the sum of M and P is constant.

8. The digital filter circuit of claim 1, wherein the digital filter is established as a finite impulse response (FIR) filter.

9. The digital filter circuit of claim 8, wherein the digital filter is established as a short-length finite impulse response (SFIR) filter.

10. The digital filter circuit of claim 1, wherein the digital filter circuit comprises a local oscillator circuit, wherein the local oscillator circuit is configured to generate a local oscillator signal.

11. The digital filter circuit of claim 10, wherein the local oscillator circuit is established as a numerically controlled oscillator.

12. The digital filter circuit of claim 1, wherein the digital filter comprises at least one of an ASIC or an FPGA.

13. The digital filter circuit of claim 1, wherein at least one of the input circuit, the first filter sub-circuit, or the second filter sub-circuit is configured to compensate time delays between the at least two real-valued input signals or between the real and imaginary parts of the at least one complex-valued input signal.

14. The digital filter circuit of claim 1, wherein the digital filter circuit comprises an output circuit, wherein the output circuit is configured to output signals filtered by the first filter sub-circuit and by the second filter sub-circuit.

15. The digital filter circuit of claim 14, wherein the output circuit is configured to compensate time delays between the at least two real-valued input signals or between the real and imaginary parts of the at least one complex-valued input signal.

16. A measurement instrument, comprising a digital filter circuit according to claim 1.

17. The measurement instrument of claim 16, wherein the measurement instrument is established as an oscilloscope, as a digital oscilloscope, as a spectrum analyzer, as a signal analyzer, or as a vector network analyzer.

18. A signal processing method of processing digital signals by a digital filter circuit, wherein the digital filter circuit comprises an input circuit, a first filter sub-circuit, and a second filter sub-circuit,
- wherein the input circuit comprises $2^M$ input channels, such that the input circuit is configured to receive up to $2^M$ real-valued input signals or up to $2^{M-1}$ complex-valued input signals, wherein M is an integer equal to or greater than 0,
- wherein the digital filter circuit has a first configuration that is associated with processing complex-valued input signals, wherein the digital filter circuit has a second configuration that is associated with processing real-valued input signals,
- wherein in the first configuration at least one complex-valued input signal is received, wherein a real part of the at least one complex-valued input signal is filtered by the first filter sub-circuit, and an imaginary part of the at least one complex-valued input signal is filtered by the second filter sub-circuit, and
- wherein in the second configuration at least two real-valued input signals are received, wherein the at least two real-valued input signals are filtered in parallel by the first filter sub-circuit and the second filter sub-circuit, and/or wherein in the second configuration at least one real-valued input signal is received, wherein the at least one real-valued input signal is filtered jointly by the first filter sub-circuit and the second filter sub-circuit with increased parallelism.

19. The signal processing method of claim 18, wherein the digital filter circuit is switchable between the first configuration and the second configuration.

* * * * *